United States Patent [19]

Miller

[11] Patent Number: 4,604,991
[45] Date of Patent: Aug. 12, 1986

[54] HOT WATER PREHEATER SYSTEM

[76] Inventor: Kenneth F. Miller, P.O. Box 342, Americus, Ga. 31709

[21] Appl. No.: 773,251

[22] Filed: Sep. 6, 1985

[51] Int. Cl.⁴ ............................................... F24J 2/04
[52] U.S. Cl. .................................... 126/437; 219/279; 237/61; 122/20 R; 165/103; 126/362; 126/365
[58] Field of Search ............... 126/362, 365, 416, 419, 126/420, 432, 437, 436, 400; 237/61, 59; 122/20 A, 20 B, 20 R, 406 R; 165/18, 24, 48 S, 48 R, 103; 4/493, 598; 219/279, 282, 308, 296, 378

[56] References Cited

U.S. PATENT DOCUMENTS

| | | |
|---|---|---|
| 735,321 | 8/1903 | Walker . |
| 1,004,888 | 10/1911 | McIntyre . |
| 1,849,266 | 3/1932 | Bentz . |
| 2,689,090 | 9/1954 | Wetherbee et al. ................... 237/1 |
| 4,119,087 | 10/1978 | Cook .................................... 126/420 |
| 4,191,329 | 3/1980 | Geaslin ................................ 126/427 |
| 4,235,223 | 11/1980 | Coxon .................................. 126/437 |
| 4,350,144 | 9/1982 | Beckwith ............................. 126/427 |
| 4,353,410 | 10/1982 | Godard ................................ 165/18 |
| 4,403,602 | 9/1983 | Warden ................................ 126/435 |
| 4,413,614 | 11/1983 | Lyon et al. .......................... 126/421 |
| 4,479,487 | 10/1984 | Migdal ............................. 126/437 X |

FOREIGN PATENT DOCUMENTS 9453  1/1984  Japan ................................. 126/420

Primary Examiner—Randall L. Green
Attorney, Agent, or Firm—LaValle D. Ptak

[57] ABSTRACT

A secondary heating source is used to preheat the water supplied to a conventional hot water tank. Three two-position valves permit the water from the water supply line to be supplied directly to the hot water tank during part of the year (such as the winter), with the secondary heating source having its inlet and its outlet connected to a drain to drain all water from it so that it does not freeze in the winter. The second position of the three valves causes the water from the water supply line to be diverted through the secondary heat source prior to supplying it to the inlet of the hot water tank, so that supplemental preheating of the hot water is effected. Manually controlled valves are used to accomplish this purposes and each of them includes indicia on it to indicate the position of operation to simplify the change-over from the "summer" mode of operation to the "winter" mode of operation.

10 Claims, 4 Drawing Figures

HOT WATER PREHEATER SYSTEM

BACKGROUND

As the cost of fossil fuels continues to increase, efforts continuously are being made to extract energy from the sun as much as possible. One area where this has been done for a number of years is to use solar energy to heat water to provide a supply of hot water for residential or commercial building. Systems for doing this range from relatively simple and somewhat inefficient systems to elaborate, expensive solar water systems which are capable of replacing the conventional gas or electrically heated hot water storage tank. In most cases, it is necessary to employ both a solar system and a conventional hot water tank, with the two systems either being operated in tandem or selectively operated individually depending upon the solar energy available. Solar hot water heating systems, however, are relatively expensive and for the most part are not cost effective as replacements for conventional hot water heating systems.

To overcome some of the high cost disadvantages of solar systems, simpler systems have evolved to operate in tandem with conventional hot water heating systems to preheat the water supplied to the conventional hot water storage tank by first passing it through some type of a solar hot water tank.

A system directed to a selective control of a combination solar hot water heater and a conventional hot water tank is disclosed in the Warden U.S. Pat. No. 4,403,602. This patent discloses a system in which a closed fluid loop is used in conjunction with solar panels for providing a heat source for heating water from a residential water supply or the like in a solar tank. The water which flows into and out of the tank does not itself flow through the solar heating unit. A conventional domestic tank also is employed and a valve arrangement is used to selectively provide all of the hot water heat from the solar heated tank, or all of the hot water heat from the domestically heated tank, or to connect the tanks in tandem where the water from the cold water supply first enters the solar heated tank and then passes from that tank into the conventionally heated tank from which it is drawn for use in the building. Five valves are shown for variously diverting the water through the different paths. The valves themselves are shown as conventional circular handle valves which do not provide any indication of the state of operation of the valve. Secondly, the system requires a pump to recirculate the heating fluid through the solar system into the solar heated hot water tank and no arrangement is made to drain any fluid from that system. The hot water which is being heated for use in the building does not pass through the solar collectors, but the closed loop system including the pump is used for that purpose.

Another patent of interest is the patent to Weatherbee U.S. Pat. No. 2,689,090. The heating system disclosed in the Weatherbee patent includes a set of solar panels on the roof of a building and another heat exchanger coil buried in the ground. There is an automatic switch-over accomplished by means of temperature sensing to cause the fluids circulating through the system to be through the ground alone or through a combination of the ground and solar system. The Weatherbee system is directed to a heating system rather than a hot water supply system, however, so that a closed loop configuration is utilized.

A shared hot water solar system is disclosed in the patent to Geaslin U.S. Pat. No. 4,191,329. Like the Weatherbee patent this is a shared system which connects in series a solar system and a domestic hot water heater for supplying water to the hot water taps in the home. A switch-over automatically is effected to the domestic hot water heater alone whenever the solar temperature is too low. A provision also is made in this patent that whenever the water in the solar panels approaches a freezing temperature, water is circulated from the household loop to the solar panels to prevent them from freezing. In very cold climates, almost continuous circulation of water in this manner would occur. When the system is operated in this mode, it is not an energy efficient system since the warmth in the water is utilized to prevent the system from becoming damaged, and substantial energy of some type must be supplied to that water for this purpose.

Solar hot water systems of various types long have been known. Several old patents directed to a solar system which is connected in series with some type of additional hot water system are the patents to Bentz U.S. Pat. No. 1,849,266; Walker U.S. Pat. No. 735,321; McIntyre U.S. Pat. No. 1,004,888; and Lyon U.S. Pat. No. 4,413,614. None of these patents include any valves or switch-over from one mode of operation to another.

It is desirable, from an energy savings point of view, to utilize as much of the sun's energy as possible. As indicated by some of the above-mentioned patents, this can be accomplished by preheating some of the water for a hot water supply before it enters the conventional hot water tank. For areas of the country where freezing temperatures are encountered, however, it is desirable to provide a simple, inexpensive, and as nearly fool proof method as possible for disconnecting and draining the water out of the solar portion of the system and simply utilizing the standard hot water tank for heating the water. Similarly when freezing is no longer a problem and a solar heating system is capable of contributing at least preheating to the water supply to the hot water tank, the switch-over back to a series or tandum arrangement of the conventional hot water tank and the solar system is desirable.

SUMMARY OF THE INVENTION

It is an object of this invention to provide an improved hot water supply system.

It is another object of this invention to provide an improved hot water supply system using a secondary heat source for preheating water supplied to a hot water tank.

It is another object of this invention to provide an improved hot water supply system employing a secondary heat source which is operable either to connect the secondary heat source in tandum with the conventional hot water tank or to operate the hot water tank alone in a conventional manner.

It is a further object of this invention to provide an improved hot water supply system which is switchable to connect a solar preheater in series with the water supply to a conventional hot water tank for preheating the water and to disconnect the solar preheating portion and drain water from it during periods when the solar preheat system is not capable of preheating the water supplied to the hot water tank.

In accordance with a preferred embodiment of this invention, a primary heated water storage tank is interconnected with a cold water supply line and a secondary water heating source by means of an arrangement of a main valve and second and third secondary valves. In one position of the valves, the secondary heat source is disconnected and water is drained from it while the water from the water supply line is supplied through the main valve to the primary heated water storage tank which operates in a conventional manner. In a second position of all of the valves, the water from the water supply line first is routed through the secondary heat source and the various valves before it is supplied to the inlet of the primary heat water storage tank which then completes the heating process.

DETAILED DESCRIPTION

Figure 1:
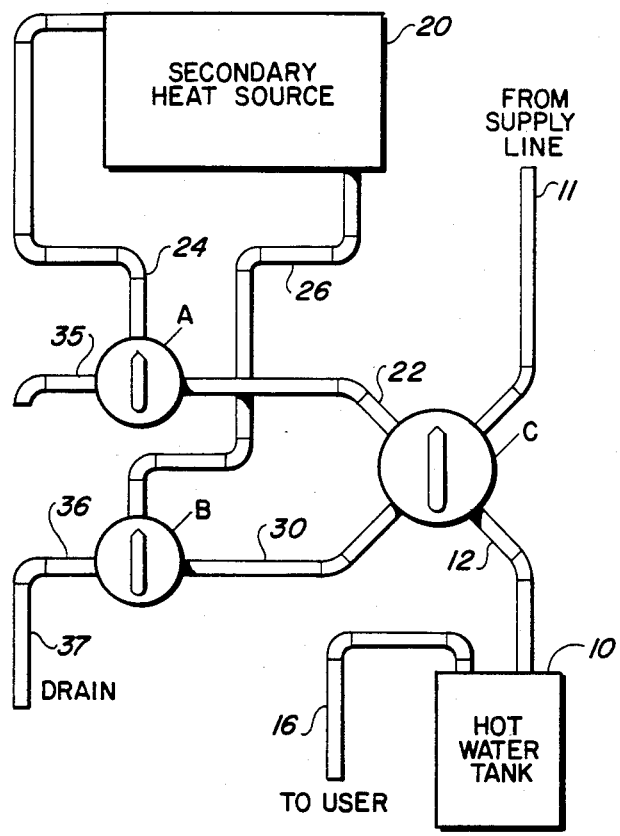
FIG. 1 is a diagrammatic representation of a preferred embodiment of the invention.

Reference now should be made to the drawing in which the same reference numbers are used in all four figures to designate the same components.

As illustrated in the drawing, a conventional hot water tank 10, which typically utilizes electric or gas for heating water in the tank, is supplied with water from an inlet pipe 12 and provides hot water through an outlet pipe 16. Water to be heated is obtained from a supply line 11 and is supplied to the pipe 12 through a first or main valve 'C' either directly from the supply line 11 or through a secondary heat source 20. Typically, this secondary heat source 20 is a solar heat source, either located in the attic of the house or commercial building with which the water tank 10 is used or located on the roof in many installations. The system which is shown in the drawing is one in which all of the water from the supply line 11 which is routed through the system is provided to the hot water tank 10. There is not recirculation in a closed loop of any heating fluid through the secondary heat source 20.

Figure 2:
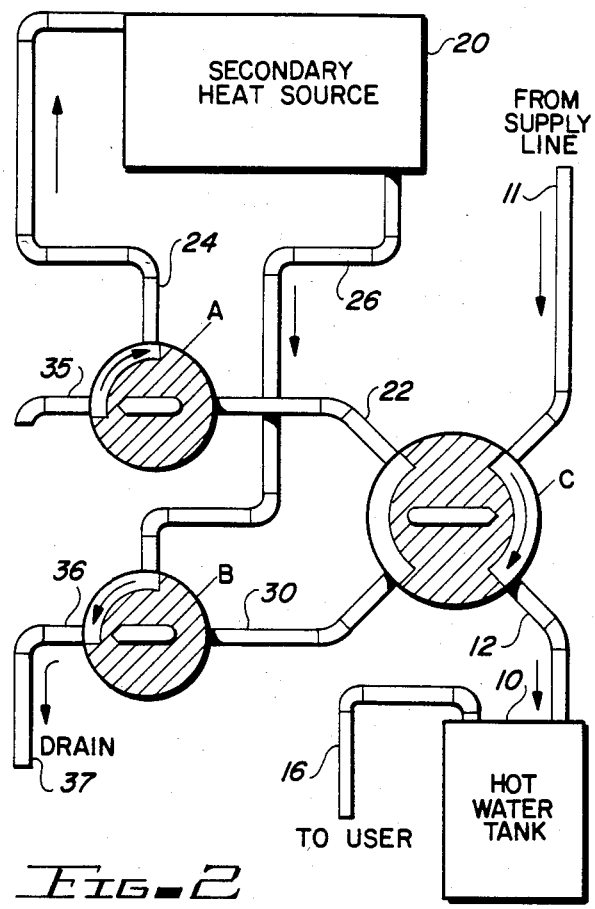
FIGS. 2, 3, and 4, are partially cut-away views of the embodiment shown in FIG. 1, illustrating different modes of operation.
Figure 3:
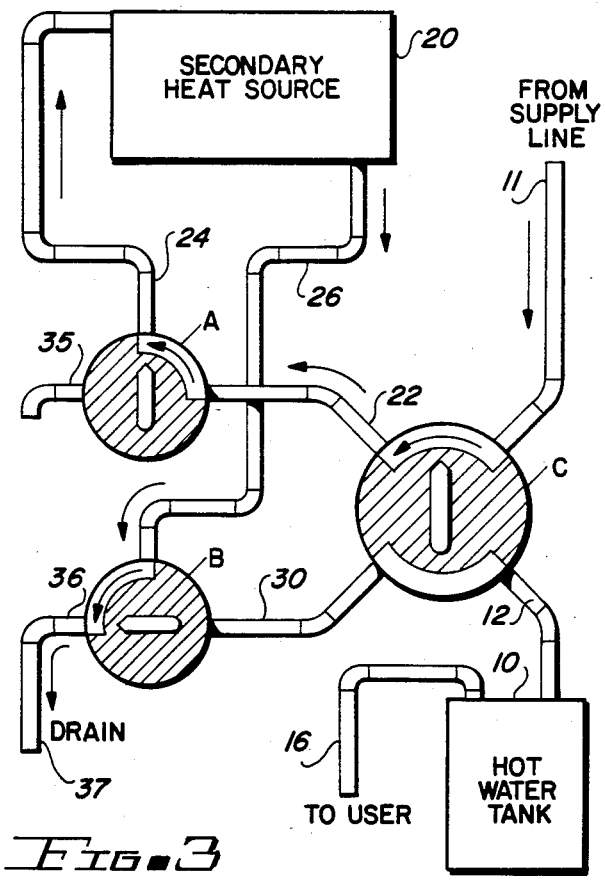
Figure 4:
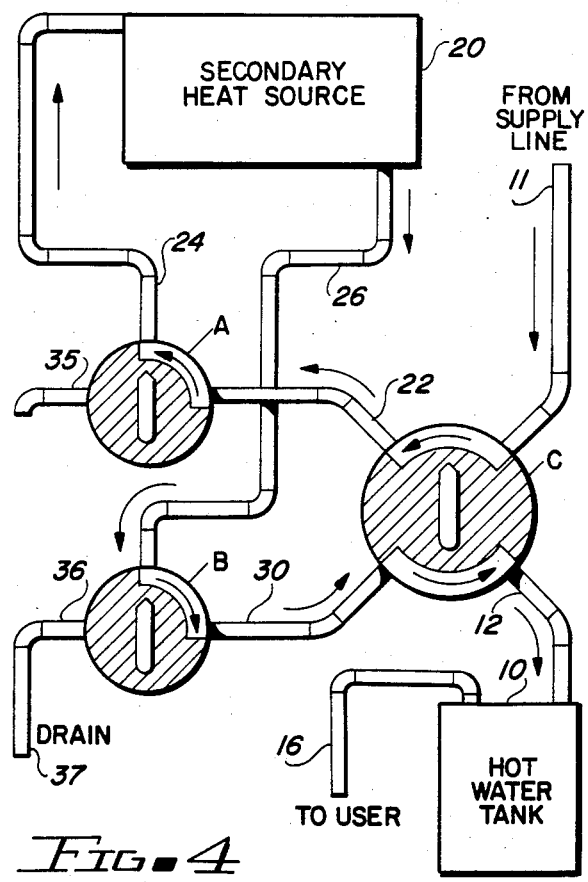

During winter operation, the secondary heat source 20 typically is not utilized and the water in it, if any, must be drained in order to prevent damage to the secondary heat source 20. Winter operating positions of the main valve 'C' and second and third auxiliary control valves 'A' and 'B' are shown in the partially cut-away view of FIG. 2. FIGS. 2, 3, and 4, all show the valves partially cut away to illustrate the water flow paths through those valves for the various positions. In the winter, the valves each are placed in a "first" position with the valve operating lever in a horizontal position. The valves 'A', 'B', and 'C', are all provided with an operating lever which clearly shows the position to which the valves are turned; so that they are simple to operate and a person can know at a glance the valve settings and therefore the water flow paths through them.

Each of the three valves are capable of operation in either one of two different rotational positions, 90° apart. With the valve operating lever in the horizontal position for all three valves 'A', 'B', and 'C', the water flow paths illustrated in FIG. 2 exist. When valve 'C' is in the position shown in FIG. 2, water flows directly from the supply line 11 through a first or upper port in the valve 'C' and outwardly through a lower port into the outlet pipe 12 to the hot water tank 10.

A secondary heat source 20, typically in the form of a solar heating coil or solar panel located either in the attic or on the roof of the buidling, is provided to preheat the water from the supply line 11 during those portions of the year when additional heat is available from such a secondary heating source. In the winter, however, the availability of heat for the secondary heat source 20 generally is insufficient to provide any preheating to the water from the supply line 11. At the same time, it is desirable to drain all water from the secondary heat source 20 to ensure that no damage occurs to the heat source 20 or the connecting pipes due to freezing of any residual water in them. Consequently, the control valves 'A' and 'B' are turned to the horizontal position illustrated in FIG. 2 to connect the normal water inlet pipe 24 for the secondary heat source and the normal water outlet pipe 26 for the heat source 20 through corresponding ports in the valves 'A' and 'B' to outlet ports connected to a pair of outlet pipes 35 and 36. When the valves 'A' and 'B' are first rotated to this position from the vertical position shown in FIG. 1, water which was present in the heat source 20, and in all of the pipes 24, 26, 35, and 36, flows through the valves 'A' and 'B' in the direction of arrows shown in FIG. 2 to drain the secondary heat source 20 and the associated pipes. Air flows up the pipe 35, through the valve A to the upper side of the secondary heat source 20. This allows water to drain down through the pipe 26, through the valve B and out the drain 36

When a change-over from the mode of operation shown in FIG. 2 to a summer mode is desired, the main valve 'C' and the first auxiliary valve 'A' first are rotated 90° from the position shown in FIG. 2 to the position shown in FIG. 3. In this position, the handles or indicia on the outside of these valves point vertically, as illustrated in both FIGS. 1 and 3. This causes water to flow from the supply line 11 through the valve 'C', the pipe 22 through the valve 'A', the pipe 24 through the secondary heat source 20, and from the secondary heat source 20 through the pipe 26, the valve 'B' and the pipe 36 to the drain 37. This is done to utilize water from the supply line 11 to purge air from the secondary heat source in the pipe 24 and 26 prior to the operation of the valve 'B'. This prevents additional air from entering the hot water tank 10 and ultimately the pipe 16 to the point of use. In this position, it is quite clear that water will continuously flow from the supply line 11 until the valve 'B' is operated to its vertical position. Consequently, the time in which the valves are left in the various relative positions shown in FIG. 3 is only long enough to cause all of the air to be expelled from the lines.

After the air has been expelled from the lines by the operation shown in FIG. 3, the secondary valve 'B' is rotated 90° to its vertical position as shown in FIG. 4. This is the summer mode of operation. The water paths through the various valves and heat sources are illustrated by the arrows in FIG. 4. As can be seen, water flows from the supply line 11 through the valve 'C' and valve 'A' to the secondary heat source 20 through the pipe 24. Water exits from the secondary heat source 20 after being heated in it and passes through the pipe 26, the valve 'B' and the pipe 30 to the valve 'C', from which the water exits through the pipe 12 to the inlet of the hot water tank 10. Depending upon the availability of the heat and the efficiency of the secondary heat source 20, the water is preheated by various amounts; so that less energy is required by the hot water tank 10 to bring the water up to its final temperature. In some situations, the secondary heat source 20 may be capable of providing water at the full maximum temperature desired.

To change back to winter operation valves 'A', 'B' and 'C', are simply rotated back to the positions shown in FIG. 2, with the operating levers or operating indicia horizontal. A window aperture may be provided adjacent the upper ports of the valves 'A' and 'B' in the pipes 24 and 26, if desired, to provide a visible means to check the presence or absence of water in these pipes. Alternatively, a provision of this type also may be made directly in the valves 'A' and 'B'.

Under some conditions of operation, it may be desirable to route the water from the supply line 11 to the hot water tank 10 directly through the valve 'C' operating in its winter mode (as shown in FIG. 2), but without draining the systems by placing the valves 'A' and 'B' in their horizontal operating position as shown in FIG. 2. This could occur during the spring or other times of the year when the heat build-up on the secondary heat source 20 is insufficient to preheat the water from supply line 11, but when there is no danger of freezing of water in either the secondary heat source 20 or the pipes 24 and 26. In such an event, the valve 'C' simply can be turned to its winter mode without changing the position of valves 'A' and 'B' from the position shown in FIG. 4. These valves simply would be cut-off from operation and no water flow would take place through them and the secondary heat source 20, even though water would be present in all of the pipes 24, 26, 22, and 30, as well as the heat source 20. The mode of operation can be changed at will depending upon the average temperatures experienced in the location where the system is installed.

Various changes and modifications will occur to those skilled in the art without departing from the true scope of this invention. For example, the particular types of valves which have been illustrated could be replaced with other valves which provide similar water flow paths under the different conditions of operation. The valves A, B, and C could be incorporated into a single housing with the pipes 22 and 30 being a part of such housing. The valves and secondary heat source also could be a new installation or added to an existing conventional hot water heating system. Various techniques may be used for providing the indicia of the operating condition of each of the valves 'A', 'B', and 'C', without departing from the invention. The secondary heat source, which has been described as a solar heat source in the preferred embodiment, could be any other suitable secondary heat source which is capable of adding heat to the water from the supply line 11. The system constitutes a simple, inexpensive, easy-to-operate system for reducing the energy consumed by a conventional hot water tank 10 and requires a minimum of components for installation.

I claim:

1. In a system for supplying hot water to a point of use from a primary heated water storage tank having an inlet and an outlet, an improvement including in combination:

a water supply line;
   a secondary water heating source having an inlet and an outlet;
   a main valve means having first and second operating positions, and first, second, third, and fourth ports;
   second and third valve means each having first and second operating positions and each having first, second and third ports;
   means for connecting said water supply line to the first port of said main valve means;
   first pipe means connecting the second port of said main valve means to the first port of said second valve means;
   second pipe means connecting the second port of said second valve means to the inlet of said secondary water heating source;
   drain means;
   pipe means connecting the third port of said second valve means and the third port of said third valve means, respectively, to said drain means;
   fourth pipe means connecting the outlet of said secondary water heating source to the second port of said third valve means;
   fifth pipe means connecting the first port of said third valve means to the third port of said first valve means; and
   means coupling the fourth port of said first valve means to the inlet of said primary heated water storage tank; and
   wherein the first position of said first valve means interconnects the first and fourth ports thereof for fluid flow therebetween, and the second position of said first valve means interconnects the first and second ports thereof for fluid flow therebetween and connects the third and fourth ports thereof for fluid flow therebetween; the first operating position of said second valve means interconnects the second and third ports thereof for fluid flow therebetween and the second operating position of said second valve means interconnects the first and second ports thereof for fluid flow therebetween; said first position of said third valve means interconnects the second and third ports thereof for fluid flow therebetween and the second position of said third valve means interconnects the first and second ports thereof for fluid flow therebetween.

2. The combination according to claim 1 wherein said valves are manually actuable.

3. The combination according to claim 2 wherein said valves have actuating levers thereon and further include indicia for externally showing the operating position thereof.

4. The combination according to claim 3, wherein with each of said valves in the first operating position, water is supplied from said water supply line through said first valve means to the inlet of said primary heated water storage tank, and both the inlet and the outlet of said secondary water heating source are connected through said second and third valve means, respectively, to said drain means to drain water from the pipes connected to said secondary heating source.

5. The combination according to claim 4, wherein with the each of said main, second and third valve means in the second operating position thereof water flows from said water supply line through said secondary heat source to the inlet of said primary heated water storage tank through respective fluid flow channels in said valve means to cause the water supplied to the inlet of said primary heated water storage tank to be preheated by said secondary heat source.

6. The combination according to claim 5, wherein upon change over from operation with said main, second and third valve means in said first operating position to the second operating position thereof, said main and said second valve means first are changed to said second operating position thereof with said third valve means being in said first operating position for a predetermined period of time to cause water to flow from said water supply line through said first valve means and said second valve means to the inlet of said secondary heat source and from the outlet of said secondary heat source through said third valve means to said drain means first to purge air from said pipes, whereupon said third valve means is then changed to said second operating position.

7. The combination according to claim 1 wherein said valves have actuating levers thereon and further include indicia for externally showing the operating position thereof.

8. The combination according to claim 1, wherein with each of said valves in the first operating position, water is supplied from said water supply line through said first valve means to the inlet of said primary heated water storage tank, and both the inlet and the outlet of said secondary water heating source are connected through said second and third valve means, respectively, to said drain means to drain water from the pipes connected to said secondary heating source.

9. The combination according to claim 8, wherein with the each of said main, second and third valve means in the second operating position thereof water flows from said water supply line through said secondary heat source to the inlet of said primary heated water storage tank through respective fluid flow channels in said valve means to cause the water supplied to the inlet of said primary heated water storage tank to be preheated by said secondary heat source.

10. The combination according to claim 5, wherein upon change over from operation with said main, second and third valve means in said first operating position to the second operating position thereof, said main and said second valve means first are changed to said second operating position thereof with said third valve means being in said first operating position for a predetermined period of time to cause water to flow from said water supply line through said first valve means and said second valve means to the inlet of said secondary heat source and from the outlet of said secondary heat source through said third valve means to said drain first to purge air from said pipes, whereupon said third valve means is then changed to said second operating position.

* * * * *